United States Patent
Maher

(10) Patent No.: US 7,124,861 B2
(45) Date of Patent: Oct. 24, 2006

(54) MOTION CONTROL APPARATUS

(75) Inventor: Jeffrey M. Maher, Hugo, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 10/783,824

(22) Filed: Feb. 20, 2004

(65) Prior Publication Data

US 2005/0183907 A1    Aug. 25, 2005

(51) Int. Cl.
*F16D 55/08* (2006.01)

(52) U.S. Cl. .................. 188/72.7; 188/44; 188/35; 188/107

(58) Field of Classification Search .............. 188/28, 188/33 X, 34, 35 X, 38, 38.5, 40, 41, 42, 188/43, 44, 45, 62, 7.27 X, 107 X
See application file for complete search history.

(56) References Cited

U.S. PATENT DOCUMENTS

| 3,388,606 | A |   | 6/1968  | Hill |
| 3,535,944 | A |   | 10/1970 | Newstead |
| 3,705,554 | A |   | 12/1972 | Aksamit ............... 104/250 |
| 3,741,349 | A | * | 6/1973  | Banks ................. 188/42 |
| 3,789,959 | A |   | 2/1974  | Kawaguchi ........... 188/71.9 |
| 3,986,584 | A | * | 10/1976 | Wright et al. ......... 188/71.8 |
| 4,018,313 | A |   | 4/1977  | Hart et al. ........... 188/343 |
| 4,179,014 | A | * | 12/1979 | Bailly ................. 188/43 |
| 4,234,060 | A | * | 11/1980 | Barsted ................ 188/44 |
| 4,235,312 | A | * | 11/1980 | Garrett et al. ......... 188/72.7 |
| 4,280,603 | A |   | 7/1981  | Kanvar ................ 188/343 |
| 4,300,664 | A |   | 11/1981 | Helm et al. ........... 188/265 |
| 4,615,515 | A |   | 10/1986 | Suzuta et al. |
| 4,633,758 | A |   | 1/1987  | Kedzierski ............. 91/44 |
| 4,638,894 | A |   | 1/1987  | Sitabkhan et al. |
| 4,703,683 | A |   | 11/1987 | Sue ..................... 92/24 |
| 4,779,787 | A |   | 10/1988 | Naruse et al. |
| 4,825,746 | A |   | 5/1989  | Herner ................. 91/45 |
| 5,096,020 | A | * | 3/1992  | Korhonen .............. 187/376 |
| 5,111,913 | A |   | 5/1992  | Granbom |
| 5,184,700 | A |   | 2/1993  | Mainardi .............. 188/67 |
| 5,333,535 | A |   | 8/1994  | Miyamoto et al. ....... 92/88 |
| 5,363,942 | A |   | 11/1994 | Osada |
| 5,377,788 | A |   | 1/1995  | Biewald et al. |
| 5,518,087 | A |   | 5/1996  | Hwang et al. |
| 5,524,548 | A |   | 6/1996  | Fox .................... 104/249 |
| 5,626,082 | A |   | 5/1997  | Nozaki ................ 104/252 |
| 5,732,799 | A |   | 3/1998  | Chikamatsu et al. ..... 188/67 |
| 5,829,811 | A |   | 11/1998 | Skinner, II ............ 294/88 |
| RE36,084  | E |   | 2/1999  | Gutknecht ............. 104/249 |
| 5,950,773 | A |   | 9/1999  | Ito |

(Continued)

FOREIGN PATENT DOCUMENTS

DE          2032625          7/1969

(Continued)

*Primary Examiner*—Devon C. Kramer
(74) *Attorney, Agent, or Firm*—Alan D. Kamrath; Nikolai & Mersereau, P.A.

(57) ABSTRACT

A brake (10) having application for a linear or rotational motion device includes a housing (120) in which a first piston (140), a wedge (142) and a second piston (144) cooperate to engage a friction facing (136) through a plurality of rollers (152, 154, 156, 158). The three part piston assembly (148) allows a braking action and prevents torsional forces that are non-axial to the axis of the first piston (140) and second piston (144). The pistons (140, 144) are biased by compression springs (176) and may be actuated by a fluid.

18 Claims, 5 Drawing Sheets

U.S. PATENT DOCUMENTS

| | | | |
|---|---|---|---|
| 5,967,051 A | 10/1999 | Ragsdale et al. | 104/252 |
| 5,988,042 A | 11/1999 | Lamle | 92/88 |
| 5,988,342 A | 11/1999 | Ito et al. | 192/144 |
| 6,135,029 A | 10/2000 | Oberjohn | 104/290 |
| 6,164,185 A | 12/2000 | Granbom | 92/19 |
| 6,227,336 B1 | 5/2001 | Rudy | 188/43 |
| 6,332,514 B1 * | 12/2001 | Chen | 188/72.7 |
| 6,412,607 B1 * | 7/2002 | Ohba et al. | 188/71.9 |
| 6,460,678 B1 * | 10/2002 | Henk et al. | 192/143 |
| 2003/0094334 A1 | 5/2003 | Hsu et al. | |

FOREIGN PATENT DOCUMENTS

| | | | |
|---|---|---|---|
| DE | 0130400 | | 3/1978 |
| DE | 200 07 499 U 1 | | 4/2000 |
| DE | 202 02 803 U | | 7/2003 |
| DE | 10207605 | * | 8/2003 |
| DE | 102 25 353 A | | 12/2003 |
| DE | 10252915 | * | 4/2004 |
| FR | 1150619 | | 5/1956 |
| FR | 1388293 | | 3/1964 |
| GB | 2175669 | | 12/1986 |
| IT | 659911 | | 1/1964 |
| RU | 800447 | | 1/1981 |
| WO | WO 98/05470 | * | 2/1998 |
| WO | WO 2004/043644 | | 5/2004 |

* cited by examiner

MOTION CONTROL APPARATUS

BACKGROUND

The present invention generally relates to motion control apparatus and in particular brakes. Specifically, the present invention relates to brakes suitable for use with a track to brake motion such as linear motion, and more specifically relates to linear motion brakes that have improved piston life and that are adjustable.

The popularity of linear motion devices in the machine tool, semiconductor, and medical industries has been increasing as the result of their ability to move a load in a linear movement direction to a position with extreme accuracy and at very high speeds. However, problems have been encountered in stopping linearly moving loads especially in the event of a power outage. Specifically, as movement and positioning of the load is dependent upon current being supplied to the linear motor, loads carried by linear motion devices will move under gravitational and/or inertia forces in the event that current is interrupted to the linear motor such as the result of a power outage. This problem is also enhanced in linear motion devices because of the use of high performance linear bearings, which minimize sliding friction. Prior workers have devised a brake that cures the above deficiencies and that works with remarkable reliability and precision, see U.S. Pat. No. 6,460,678 to Henk et al.

Prior art devices have utilized a one piece piston assembly to accomplish braking motion. A one piece piston assembly may apply undesirable forces to piston components.

Also, it is desirable to be able to adjust the relative position of actuator elements of friction facings to compensate for manufacturing tolerances and/or friction facing wear.

Thus, a need exists for a brake for stopping linearly moving loads and especially for use with linear motion devices and particularly for use in stopping linearly moving loads that reduces stress on piston parts and that is adjustable.

SUMMARY OF THE INVENTION

The present invention solves these needs and other problems in the field of linear motion brakes by providing, in the preferred form, an apparatus including a wedge moveable along a first axis. The wedge has a wedge surface arranged nonparallel to the first axis. An actuator is moveable along a second axis perpendicular to the first axis. The actuator has a wedge engaging surface that engages with the wedge surface. The actuator also has a friction creating portion. Movement of the actuator along the second axis is dependent on movement of the wedge along the first axis. A wedge axial mover is in contact with the wedge for moving the wedge along the first axis. The wedge axial mover is in motion isolated contact to prevent motion transfer from the wedge to the wedge axial mover nonparallel to the first axis.

The invention further provides in the preferred aspects that the wedge axial mover has a first chamber and a first piston moveable in the first chamber along the first axis. The first piston is in motion isolated contact with the wedge to move the wedge along the first axis in response to introduction of fluid in the first chamber.

The invention further provides in the preferred aspects that a stem guide separates the first chamber from the wedge. The first piston further has a stem, with the stem extending along the first axis in the stem guide and with the stem abutting the wedge opposite of the stem guide than the first chamber.

The invention further provides in the preferred aspects that the wedge axial mover further has a second chamber and a second piston moveable in the second chamber along the first axis. The second piston is in motion isolated contact with the wedge to move the wedge along the first axis in response to introduction of fluid in the second chamber.

The invention further provides in the preferred aspects that the second piston has the shape of a disk and that the disk has a surface perpendicular to the first axis with the surface abutting the wedge.

The invention further provides in the preferred aspects that the introduction of fluid in the first chamber and the introduction of fluid in the second chamber moves the first piston and the second piston in the same direction.

The invention further provides in the preferred aspects that the wedge axial mover is a spring mounted along the first axis. The wedge is biased by the spring in one direction along the first axis.

The invention further provides in the preferred aspects that a housing has an adjustable guide that is adjustable in a second axis perpendicular to the first axis. The wedge further has a guide engaging surface in contact with the adjustable guide to adjust the position of the wedge in the second axis by slideable contact with the adjustable guide.

The invention further provides in the preferred aspects that the housing has a disk shaped opening, and with the adjustable guide has a disk shape for receipt in the disk shaped opening with the wedge slidably mounted on the adjustable guide to adjust the position of the wedge in the second axis by slideable contact with the adjustable guide.

The invention further provides in the preferred aspects that the housing further has a threaded guide aperture for receipt of the adjustable guide. The adjustable guide further has threads for slidably mounting in the threaded guide aperture to adjust the position of the wedge in the second axis by slideable contact with the adjustable guide.

The invention further provides in the preferred aspects that the wedge further has a first plurality of rollers mounted on a first side of the wedge and a second plurality of rollers mounted on a second side of the wedge. The first plurality of rollers contacts the actuator, and the second plurality of rollers contacts the adjustable guide.

The invention further provides in the preferred aspects that the first plurality of rollers are mounted on bearings on the wedge and has contact with the wedge engaging portion of the actuator. The second plurality of rollers are mounted on bearings on the wedge and has contact with the guide.

The invention further provides in the preferred aspects that the wedge engaging surface forms a wedge shaped slot in the actuator to provide mechanical advantage to the wedge when the wedge engages the actuator to move the friction creating portion.

The invention further provides in the preferred aspects a housing, with the friction creating portion comprising a friction facing that is slideably received in the housing along the first axis and that is elongated along the first axis.

The present invention will become clearer in light of an illustrative embodiment of this invention described in connection with the drawings.

DESCRIPTION OF THE DRAWINGS

The illustrative embodiment may best be described by reference to the accompanying drawings where.

Figure 1:
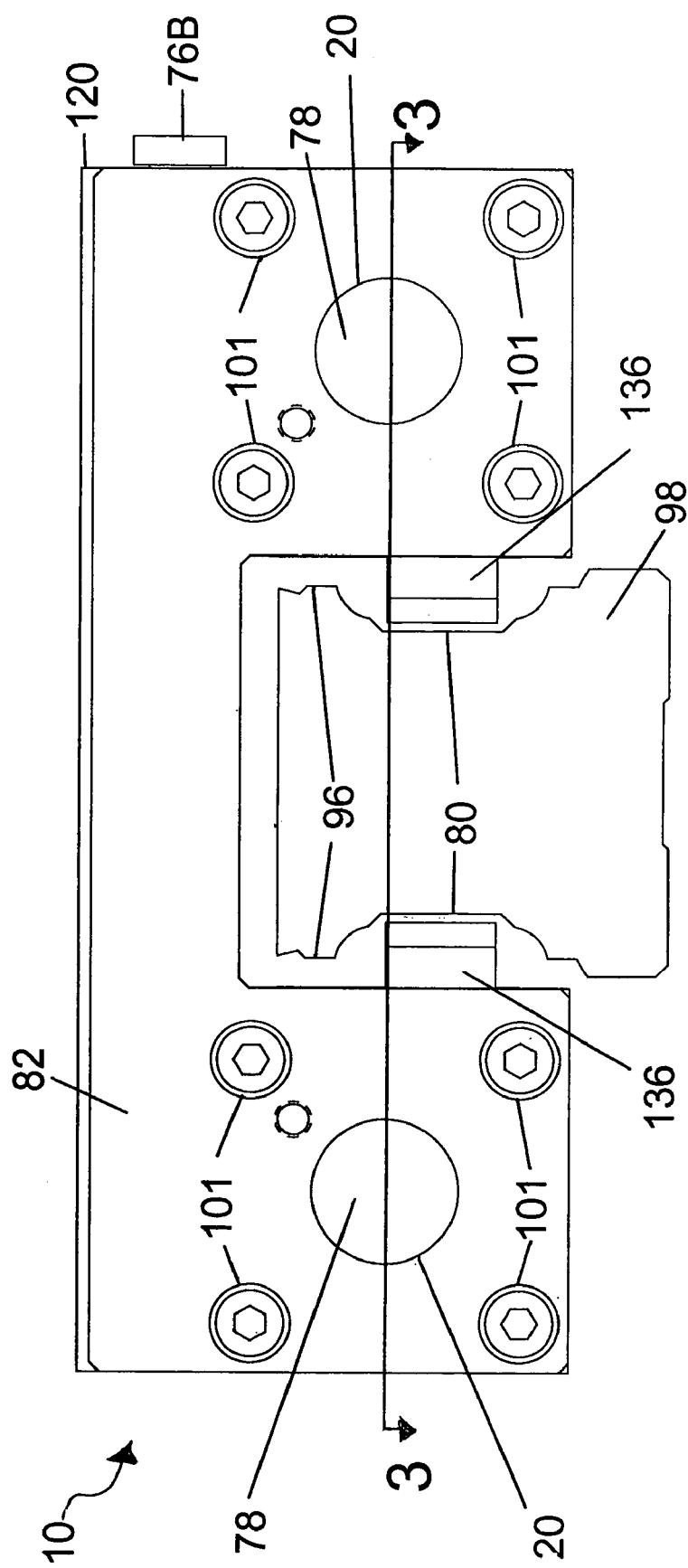
FIG. 1 shows a front view of a linear motion brake according to the preferred teachings of the present invention.
Figure 2:
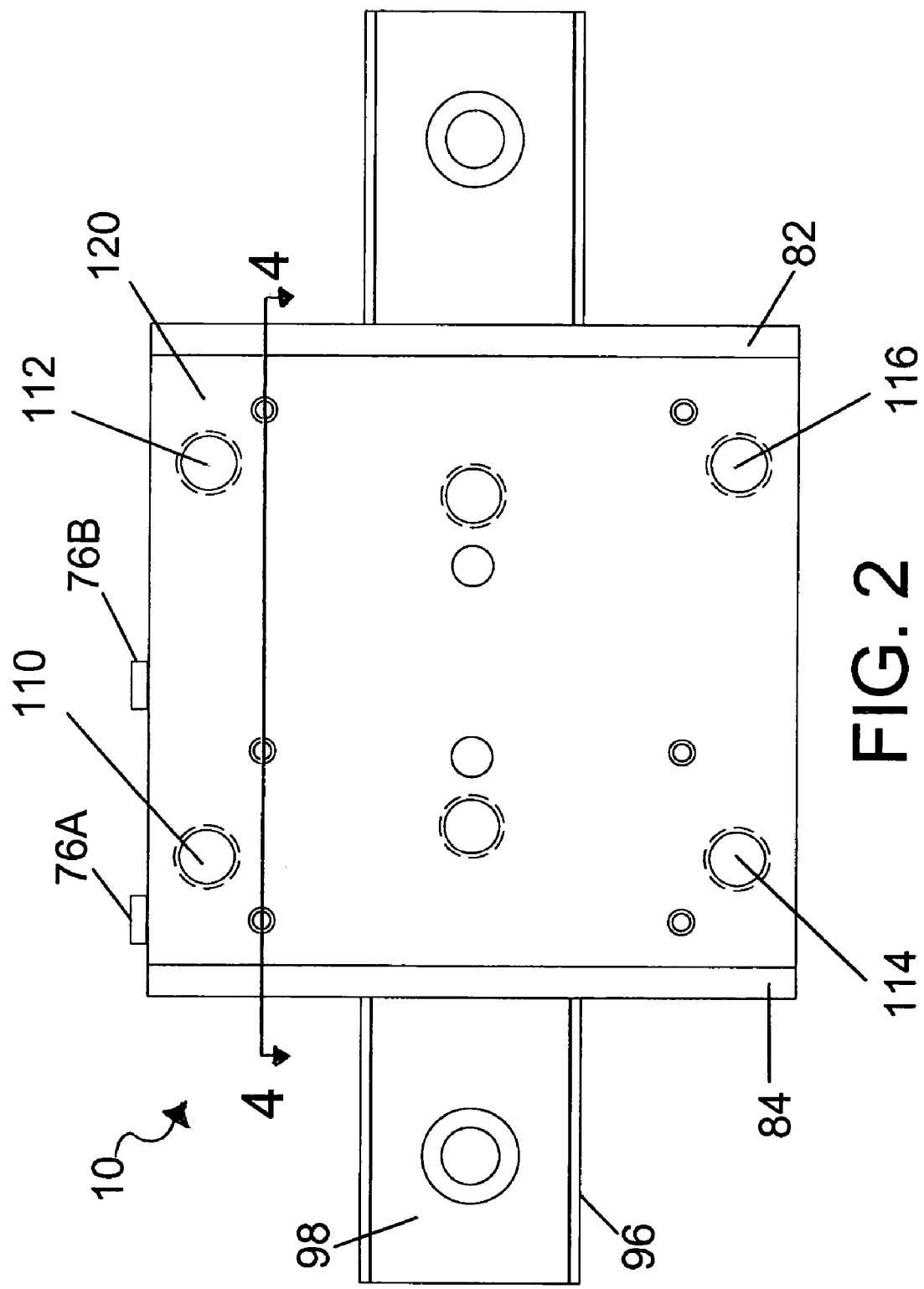
FIG. 2 shows a top view of the linear motion brake of FIG. 1.
Figure 3:
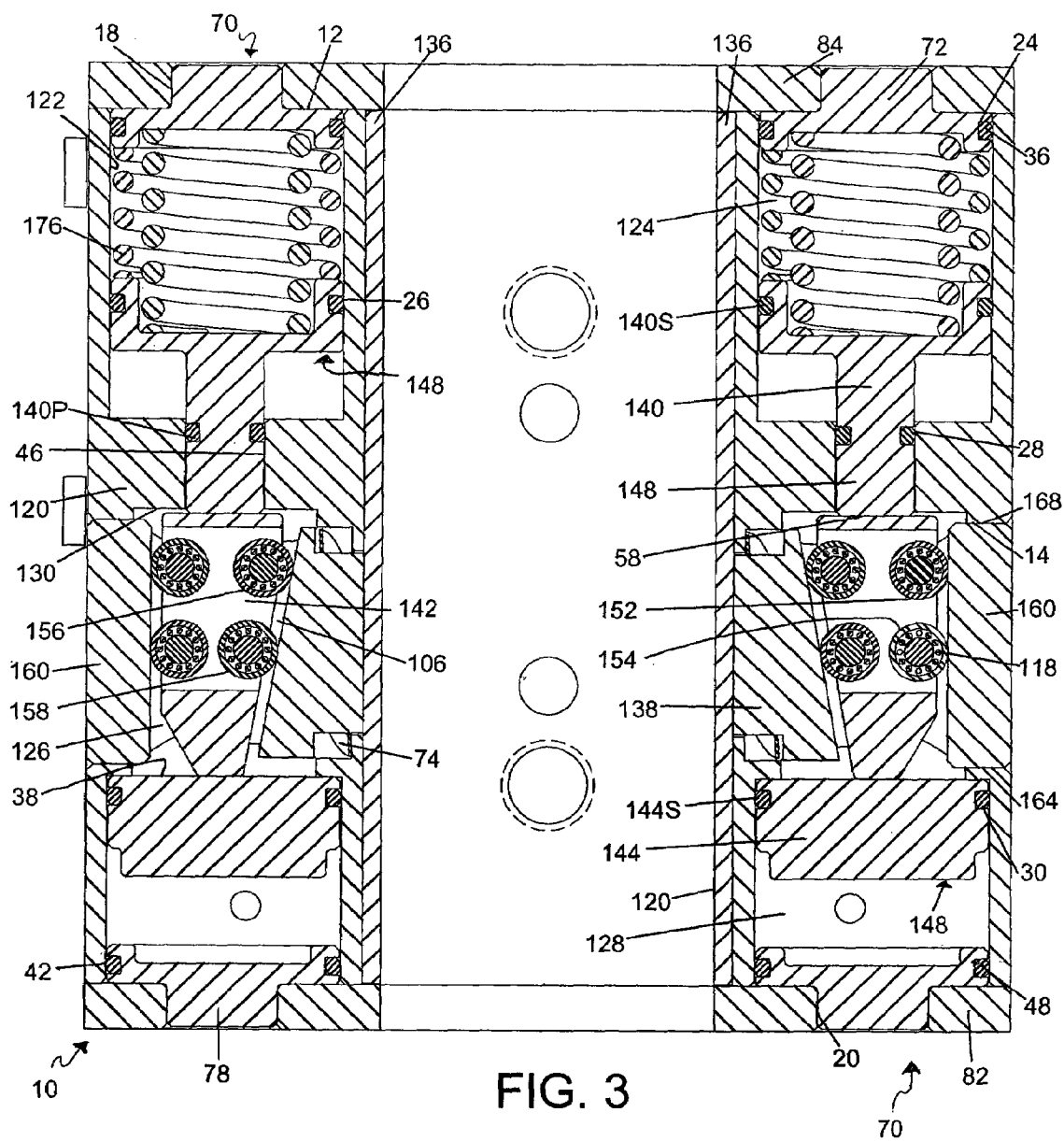
FIG. 3 shows a cross sectional view of the linear motion brake of FIG. 1 according to section line 3—3 of FIG. 1.
Figure 4:
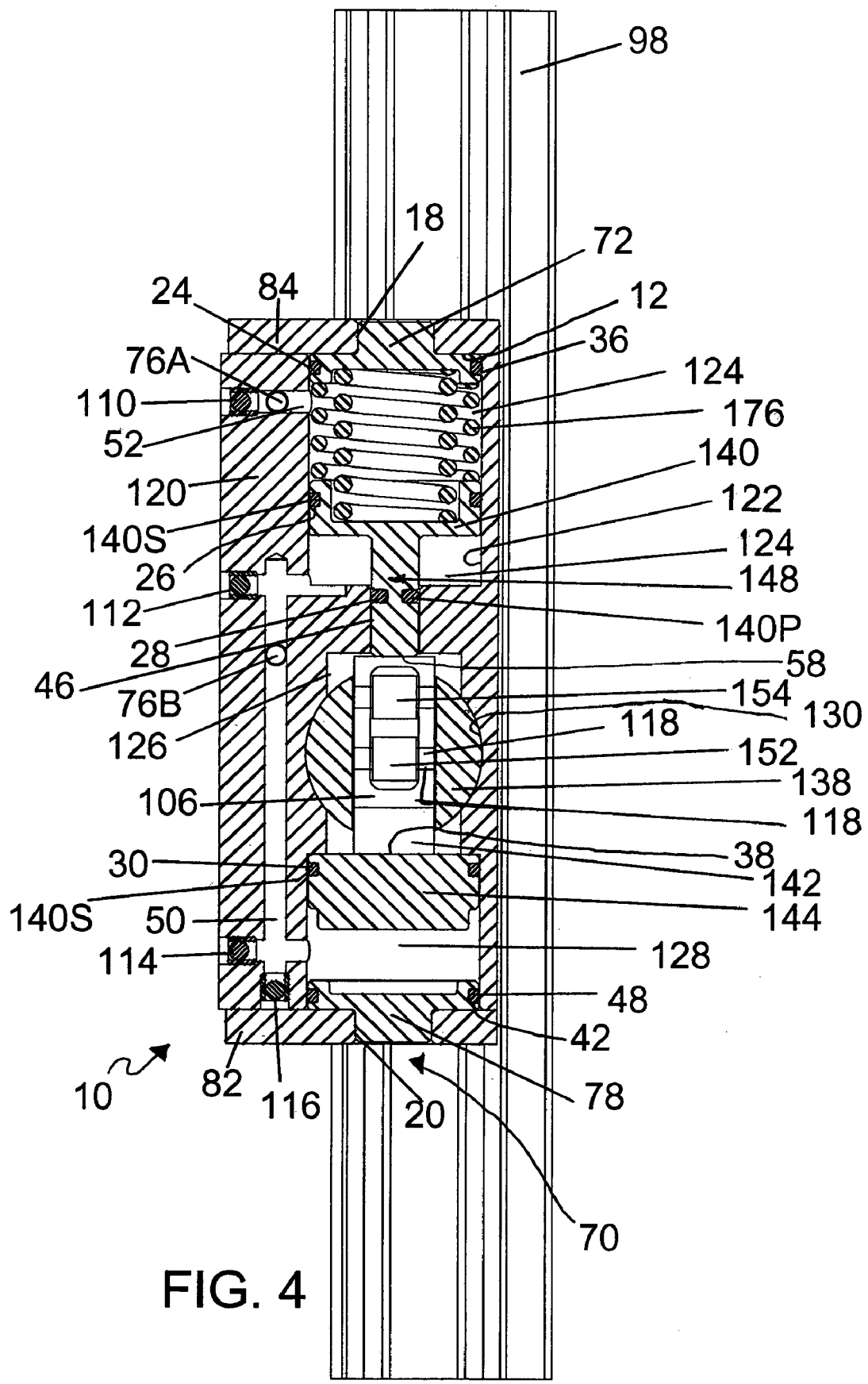
FIG. 4 shows a cross sectional view of the linear motion brake of FIG. 1 according to section line 4—4 of FIG. 2.
Figure 5:
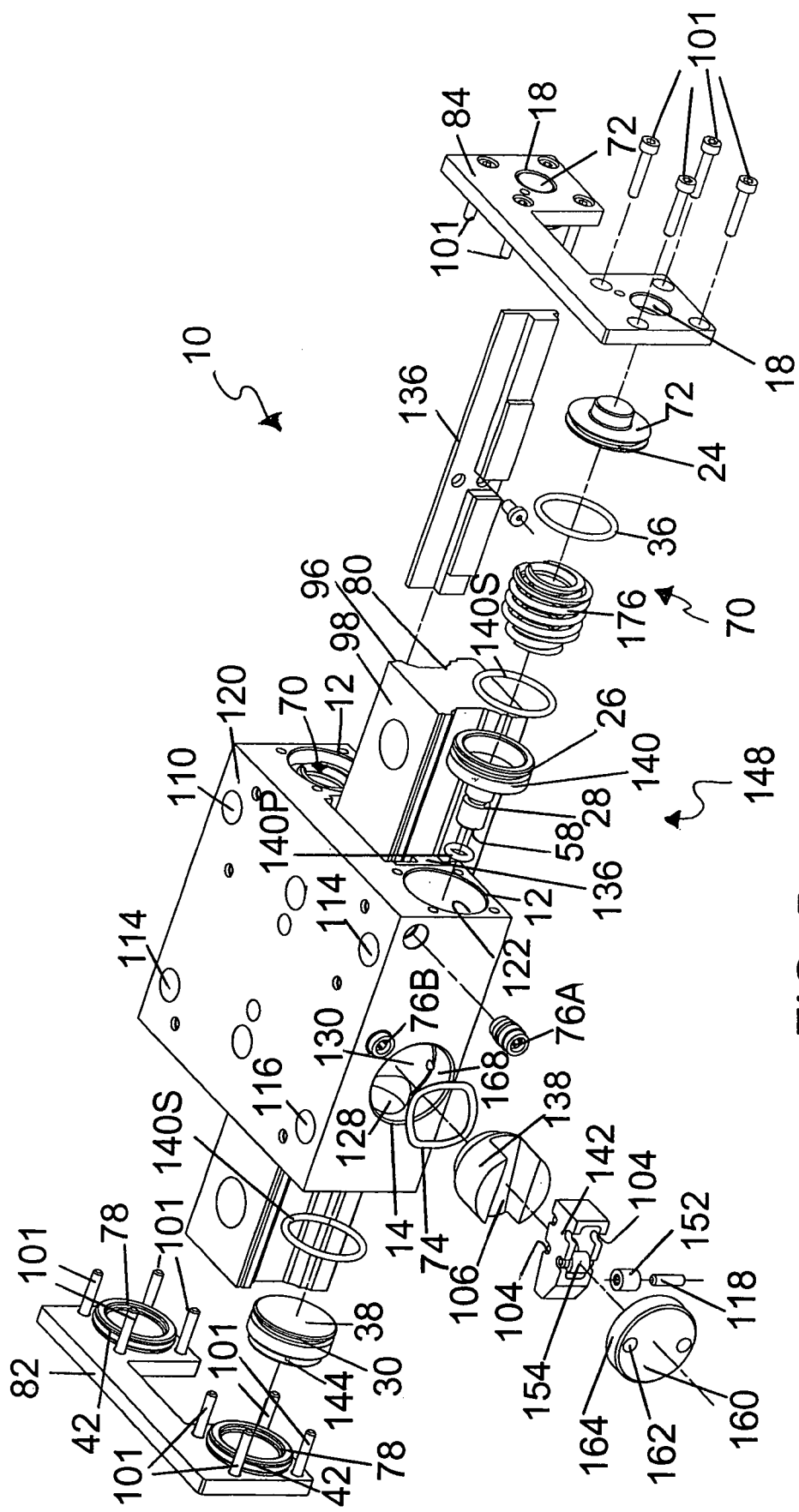
FIG. 5 shows an exploded view of the linear motion brake of FIG. 1.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various Figures of the drawings, the same numerals designate the same or similar parts. Furthermore, when the terms "first", "second", "inside", "outside", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENT

An apparatus for controlling motion shown in the most preferred form as a brake for stopping linearly moving loads according to the preferred teachings of the present invention is shown in the drawings and generally designated 10. Suitable provisions are provided to house the mechanisms of the brake 10. According to the preferred teachings of the present invention, the brake 10 generally includes a housing 120. Those skilled in the art will recognize that the housing 120 may be constructed from any suitable material able to maintain dimensional stability under the forces and stresses of braking. In one example embodiment according to the preferred teachings of the present invention, the housing 120 is machined from an aluminum extrusion for strength and for reduced weight.

Housing 120 has two braking actuators 70 that work in concert to provide a braking action on rail 98. Those skilled in the art will recognize that a single one of the two actuators 70 may be used without deviating from the spirit and scope of the invention. The braking actuators 70 each control a friction creating portion, which in the preferred form is a friction facing 136, that contacts the rail 98 and provides a braking action by contacting rail 98 causing a friction force therewith.

Each braking actuator 70 has an axial through bore 122 and a cross bore 130. According to the preferred teachings of the present invention, each axial through bore 122 includes a first actuator chamber portion 124 of a generally circular cross section which terminates in a transmission portion 126 of a generally rectangular cross section which in turn terminates in a second actuator chamber portion 128 of a generally circular cross section.

Suitable provisions are provided to close and fluidically seal the outer ends 12 of the first actuator chamber portion 124. According to the preferred teachings of the present invention, an end cap 84 is provided to close the outer ends 12 of each first actuator chamber portion 124. End cap 84 further has first and second circular orifices 18 for receipt of a chamber plug 72. A peripheral groove 24 on each chamber plug 72 is designed to receive O-ring 36. O-ring 36 seals against the interior of first actuator chamber portion 124.

Suitable provisions are provided to close and fluidically seal the outer ends of the second actuator chamber portions 128. Preferably, an end cap 82 is provided to close the outer ends of second actuator chamber portions 128. End cap 82 further has first and second circular orifices 20 for receipt of a chamber plug 78. A peripheral groove 42 on each chamber plug 78 is designed to receive O-ring 48. O-ring 48 seals against the interior of second actuator chamber portion 128.

In the most preferred form, end cap 82 and end cap 84 are removably secured to housing 120 by plate screws 101.

According to the preferred teachings of the present invention, each cross bore 130 includes a portion of a generally circular cross section which terminates at and crosses the transmission portion 126 of the through bore 122 and which is of a generally rectangular cross section that terminates in a second generally circular cross section. In the preferred form, cross bore 130 intersects generally perpendicularly to through bore 122.

Suitable provisions are provided to control the friction facing 136. According to the preferred teachings of the present invention, each cross bore 130 has an actuator 138 for braking control of the friction facing 136. Each actuator 138 has a generally circular cross section with a wedge shaped cross section formed partially through one side.

Suitable provisions are provided for mounting actuator 138 in and for reciprocal movement inside the cross bore 130. According to the preferred teachings of the present invention, a portion of cross bore 130 is shaped to accommodate and hold one side of the actuator 138 in the two axes perpendicular to the axis parallel to the cross bore 130 and to accommodate and allow axial movement along an axis generally parallel to the cross bore 130. Actuator 138 is of a size and shape for linear movement within cross bore 130. Actuator 138 is connected to the friction facing 136 so that when actuator 138 moves the friction facing 136 also moves.

Suitable provisions are provided to bias actuator 138 in the cross bore 130. According to the preferred teachings of the present invention, each actuator 138 is biased by a wave spring 74. The wave spring 74 is sandwiched between a spring lip formed in the housing 120 at the end of the cross bore 130 and a seat formed in the actuator 138. A portion of the actuator 138 protrudes through the wave spring 74 so that one end of the actuator 138 is held proximate to the friction facing 136.

Suitable provisions are provided to control the motion of the actuator 138 and to control the force that the actuator 138 applies to the friction facing 136. According to the preferred teachings of the present invention, a wedge 142 is provided to transmit motion and braking force to the actuator 138. The wedge 142 is located in the generally rectangular portion of the cross bore 130 and the transmission portion of the through bore 122. The wedge 142 is generally wedge shaped with a first flattened end and a second opposing flattened end.

Suitable provisions are provided to allow the wedge 142 to move within the cross bore 130 with respect to actuator 138. According to the preferred teachings of the present invention, the wedge 142 further has rollers 152 and 154 for contact with a guide 160. The wedge 142 has four mounts for rollers 152, 154, 156, and 158. In the most preferred form, rollers 152, 154, 156 and 158 are suitably secured to each wedge 142 by bearings 118 mounted into roller cavities 104 in each wedge 142. Each roller cavity 104 includes a periphery of a size and shape such that the rollers 152, 154, 156 and 158 are free to individually roll without contact with each other. The rollers 152, 154, 156 and 158 lower the amount of force required to move the actuator 138 by reducing the friction between the actuator 138 and the wedge 142 and the wedge 142 and the guide 160.

The wedge shaped portion of the actuator 138 includes first and second cross sections of a generally rectangular configuration and having a rectangular section of increasing spacing from the first flattened end to the second flattened end. One side of the wedge shaped portion provides a wedge shaped slot 106 partially through one side of the actuator 138 to accommodate the plurality of rollers 156 and 158 on the wedge 142. The wave spring 74 biases the actuator 138 against the plurality of rollers 156 and 158.

Because the wedge shaped slot 106 follows one side of the wedge shaped portion, the rollers 156 and 158 follow generally wedge shaped slot 106 that takes them increasing deeper into the actuator 138. The wedge shape provides an inclined plane, with respect to one side of the actuator 138, upon which the plurality of rollers 156 and 158 roll. By holding the actuator 138 in two axes with respect to the housing 120, an inclined plane of the actuator 138, formed by the wedge shaped slot 106 along the wedge portion of the actuator 138, and the shape of the wedge 142 provides mechanical advantage to help move the actuator 138, which, in turn actuates the friction facing 136.

Those skilled in the art will appreciate that by changing the angle of the inclined plane of the actuator 138 and the relative angles of the sides of the wedge 142, the amount of mechanical advantage may be controlled. Those skilled in the art will also recognize that the actuator 138 may have any cross sectional shape that allows transmission of the force of braking from the rollers 156 and 158.

By providing a force axial to the cross bore 130 to one side of the friction facing 136, the actuator 138 moves the friction facing 136 and causes the friction facing 136 to come in contact with the rail 98 and presses the friction facing 136 against the rail 98 providing a braking force normal to the rail 98. Friction between the friction facing 136 and the rail 98 creates the braking force.

Suitable provisions are provided for guiding and adjusting the position of the wedge 142 relative to the actuator 138 and ultimately the position of the friction facing 136. According to the preferred teachings of the present invention, the rollers 152 and 154 roll on the inside surface of the guide 160. The guide 160 is in the shape of a disk with a pair of drilled holes 162 formed on the outside surface.

Suitable provisions are provided for changing the axial position of the guide 160 along the axis of the cross bore 130. According to the preferred teachings of the present invention, the guide 160 has peripheral threads 164 that mate with mating threads 168 in an opening 14 in the housing 120 at one end of the cross bore 130. The guide 160 is adjustable by turning with a spanner wrench received in the pair of drilled holes 162 which in turn turns the guide 160 on its peripheral threads 164 which changes the axial position of the guide 160 with respect to the housing 120. Since rollers 152 and 154 roll on one side of guide 160, the axial position of the wedge 142, and ultimately the axial position of the actuator 138 and friction facing 136 may also be controlled.

Suitable provisions are provided to drive or axially move the wedge 142 continuously in both directions generally parallel to the axis of the through bore 122 and in the most preferred form that is isolated from any forces that are perpendicular to the axis of the through bore 122, or any non axial forces, such as torsional and translational forces not axial to the axis of the through bore 122. According to the preferred teachings of the present invention, brake 10 further includes two multipart piston assemblies 148. Each of the multipart piston assemblies 148 has a first piston 140 and a second piston 144 on opposite ends of the wedge 142. Each first piston 140 includes a periphery of a size and shape for slideable receipt in the first actuator chamber portion 124. Each second piston 144 includes a periphery of a size and shape for slideable receipt in the second actuator chamber portion 128. Each wedge 142 has the first flattened end in contact with first piston 140 and an opposite second flattened end in contact with the second piston 144.

Suitable provisions are provided to reciprocate the wedge 142 in transmission portion 126. According to the preferred teachings of the present invention, the first piston 140 moves in a first axial direction and drives the wedge 142 from a first side, reciprocating the wedge 142 in that direction, and the second piston 144 moves in an opposite axial direction and drives the wedge 142 from a second side, reciprocating the wedge 142, in an opposite direction.

Suitable provisions are provided to adjust the position of the wedge 142 in the transmission portion 126. In the preferred form, wedge 142 is biased in a first axial direction by the combination of the wedge 142 geometry, the actuator 138 geometry and the geometry of concentric compression springs 176 that are located in first actuator chamber portion 124 and sandwiched between the chamber plug 72 and the first piston 140. A proper bias position either positions the friction facing 136 away from the rail 98 to prevent drag, or positions the friction facing 136 in a partial or total braking position depending on the intended default function of friction facing 136. Those skilled in the art will appreciate that the biasing position of the wedge 142 can be changed by altering, for example, the angle of the wedge portion of the actuator 138, the angle of the wedge 142 sides, to a small extent by the adjustment of the guide 160, and the length and position of the compression springs 176. In an alternate embodiment according to the preferred teachings of the present invention, other means of providing a bias or default position of the wedge 142 can be used in combination or alternately without deviating from the spirit and scope of the invention such as fluid pressure in the first actuator chamber portion 124.

Suitable provisions are provided to drive or axially move the wedge 142 in a direction parallel to the axis of the through bore 122. According to the preferred teachings of the present invention, piston 140 is operationally interrelated to wedge 142 and moveably mounted to housing 120 between reciprocating positions by being slideably received in through bore 122 in one most preferred form. Particularly, each first piston 140, in the most preferred form, has a cross section of a size and shape for slideable receipt in through bores 122, which in the most preferred form is circular. In particular, each first piston 140 has surfaces for slideable contact with the first actuator chamber portion 124 and point or push contact, motion isolated contact, with wedge 142. Each second piston 144 further includes an inner surface 58 to mechanically engage wedge 142. The inner surface 58 of first piston 140 is in contact with, but not attached to, wedge 142 to prevent unwanted motion of the wedge 142.

The compression springs 176 rest directly on a first end of the first piston 140, the opposite end of the first piston 140 contacts the wedge 142 on one end. The through bore 122 at this point reduces in diameter to become a stem guide 46 to accommodate the piston stem.

Suitable provisions are provided to fluidically seal parts of the first actuator chamber portion 124. In the most preferred form, each first piston 140 is provided in sealing receipt in the respective first actuator chamber portion 124. In the most preferred form, each first piston 140 is sealed with the first actuator chamber portion 124 by an elastomeric seal such as an O-ring 140S received in a peripheral groove 26, and an O-ring 140P received in a piston stem groove 28. Thus, a first sealed fluid chamber is created in first actuator chamber portion 124 by chamber plug 72 and O-ring 36 and by first piston 140 and O-ring 140S. Fluid is fed to the first sealed fluid chamber by conduit 52. A second sealed fluid chamber is created in first actuator chamber portion 124 by the first piston 140 and O-rings 140S and 140P. Fluid is fed to the second sealed fluid chamber by conduit 50.

Suitable provisions are provided to drive or axially move the wedge 142 from a direction opposite the first piston 140. According to the preferred teachings of the present invention, the brake 10 further includes the second piston 144 in each brake actuator 70. The second piston 144 is operationally interrelated to wedge 142 and moveably mounted to housing 120 between reciprocating positions by being slideably received in through bore 122 in one most preferred form. Particularly, each second piston 144, in the most preferred form, has a cross section of a size and shape for slideable receipt in through bores 122, which in the most preferred form is circular. In particular, each second piston 144 has surfaces for slideable contact with the second actuator chambers 128 and point or push contact, motion isolated contact, with wedge 142. Each second piston 144 further includes an inner surface 38 to mechanically engage wedge 142. The inner surface 38 of second piston 144 is in contact with, but not attached to, wedge 142 to prevent unwanted motion of the wedge 142.

Suitable provisions are provided to fluidically seal parts of the second actuator chamber portions 128. The second piston 144 has O-rings 144S that fit in a peripheral groove 30 of second piston 144. Thus, a sealed fluid chamber is created in second actuator chamber portion 128 by chamber plug 78 and O-ring 48 and by second piston 144 and O-ring 144S. Fluid is provided to the sealed fluid chamber by conduit 50.

It should be appreciated that the free receipt of wedge 142 in the transmission portion 126 prevents rotation and misalignment of wedge 142 in cross bores 130 even when the friction facing 136 places nonaxial loads on the actuator 138. The first piston 140 is free to move with respect to the housing 120 but is contained by the first actuator chamber portion 124. The first piston 140 can also move with respect to the wedge 142 in non-axial directions. The second piston 144 can also move with respect to the wedge 142 in non-axial directions. This configuration allows the wedge 142 to move freely within the transmission portion 126 without transmitting unwanted non-axial forces, such as torsional or translational forces directly to the second piston 144 and the first piston 140 as they move to actuate the wedge 142. These unwanted motions and forces cause premature wear on internal parts such as the O-rings and causes increased friction on components of wedge 142.

The guide 160 and actuator 138 confine the wedge 142 in its motion in a straight path. Since the guide 160 can be adjusted, the position that it holds the internal elements in can be continuously adjusted. The actuator 138 confines the motion of the rollers 156 and 158 along the wedge shaped slot 106 on the wedge shape in the actuator 138. In one direction, the movement of the wedge 142 will tend to push on the guide 160 and the actuator 138. Since the actuator 138 is the member free to move with respect to the housing 120, it will move out and initiate a braking action through friction facing 136. Since the guide 160 is adjustable, the position at which the guide 160 engages the wedge 142 in turn will adjust the position of the actuator 138 and in turn adjust the position of the friction facing 136 and the points that each friction facing 136 engages the rail 98.

Particularly, in the preferred form, suitable provisions are provided in housing 120 for removably mounting friction facing 136 of a size corresponding to and for receipt of friction facing 136 and screws extending through friction facing 136. The friction facing 136 is generally rectangular with rectangular cross sections.

The friction facing 136 is of a size and shape for slideable receipt on the outer surface of guide rail 98 in channel 80. Guide rail 98 is formed of suitable material that can withstand the forces of braking. Additionally, housing 120 is C-shaped for clearance of shoulders 96 of guide rail 98.

Each wedge 142 includes a periphery of a size and shape for slideable receipt in transmission portion 126 on two sides, in one axis, and in sliding receipt on two sides, in a second axis, and are constrained by the first piston 140 on one end and by the second piston 144 on a second end. The wedges 142 are free to align themselves, in one axis, with movement of the rollers 152, 154, 156 and 158 as they roll on the actuator 138 and the guide 160, respectively. Since the guide 160 is adjustable, the alignment of the wedge 142 can be adjusted in the axis parallel to the adjustable axis of the guide 160.

Fluid caps 110, 112, 114 and 116, located on housing 120, seal conduits 50 and 52 after drilling. The fluid connections 76A and 76B are provided to move the fluid connect point for side access. Those skilled in the art will recognize that fluid cap 110 and any one of fluid caps 112, 114, and 116 can be replaced by a fluid connection for fluid access.

Suitable provisions are provided for controlling the operation of the brake 10. According to the preferred teachings of the present invention, the fluid connection 76A allows fluid to exhaust providing an atmospheric or low pressure connection. The fluid connection 76B, when connected to a fluid pressure source, provides conduit 50 with a source of fluid under pressure into the fluid chamber defined in first actuator chamber portion 124 and the fluid chamber behind the first piston 140. The two fluid chambers provide additional force by adding additional area, the areas of the first piston 140 and second piston 144.

Thus, if the fluid pressure is insufficient to offset the bias force of compression springs 176, compression springs 176 will move wedge 142 to a predetermined position, such as the engaged position or to the disengaged position or any position in between. If the pressure in conduit 50 and thus the pressure in the fluid chambers defined in the second actuator chamber portion 128 and behind the first piston 140 is sufficient to offset the bias force of the compression spring 176, the first piston 140 will move the wedge 142. As pressure in conduit 50 increases, the wedge 142 will move more.

Those skilled in the art will recognize that concentric compression springs 176 can be replaced with a single spring or more than two springs without deviating from the spirit and scope of the invention. According to an alternate preferred embodiment of the invention, when connected to a fluid pressure source, conduit 52 provides fluid under pressure into the fluid chamber defined in first actuator chamber portion 124. This alternate embodiment can replace or be in addition to the compression springs 176.

Those skilled in the art will appreciate that the motion of the wedge 142 can accomplish any number of default and actuated results including braking with fluid pressure off and braking with fluid pressure partially on or fully on. This can be controlled by the direction of the wedge 142 and wedge portion of the actuator 138 with respect to the first piston 140 by having the widest portion of the wedge 142 closest to the first piston 140. Those skilled in the art will also recognize that the compression springs 176 can be installed on the other side of the first piston 140.

Those skilled in the art will appreciate that any suitable fluid can be used as the working fluid in the fluid portions of the brake 10 and are within the spirit and scope of the invention such as a gas such as air.

It should be appreciated that movement of wedge 142 in the first axial direction in transmission portion by compression springs 176 in the most preferred form shown moves the friction facing 136 toward their engaged position whereas movement of wedge 142 in the second axial direction in transmission portion by fluid pressure in the fluid chamber in the most preferred form shown moves the friction facing 136 toward its disengaged position.

Now that the basic construction of brake 10 according to the preferred teachings of the present invention has been explained, a method of operation of brake 10 can be set forth. Specifically, in normal operation of brake 10 and specifically in other than power outage, emergency stop, parking and similar situations, fluid is provided to the fluid chambers of brake 10 with sufficient pressure to move wedge 142. When friction facing 136 is in a spaced relation from channel 80, a drag force is not created between brake 10 and rail 98. Also, it should also be appreciated that in the most preferred form, brake 10 is disengaged in normal operations and is engaged in only limited circumstances such that wear of friction facing 136 is minimal.

Specifically, all components of brake 10 are formed of lightweight material and preferably aluminum to minimize mass and inertia forces, but those skilled in the art will appreciate that any suitable material can be used without deviating from the spirit and scope of the invention.

Brake 10 according to the teachings of the present invention can be utilized to stop linearly moving loads in the event of a power outage, emergency stop, parking or similar situation. However, according to the teachings of the present invention and in the event of a power outage, power would be simultaneously interrupted to the motive force, which is moving and holding wedge 142 against the bias of compression springs 176. In the case of the most preferred form wherein the motive force is fluid, the interruption of power could release solenoid valves, which would dump fluid from the fluid chamber of brake 10. In any case, when fluid pressure decreases, compression spring 176 will move wedge 142 from its disengaged position to its engaged position. Movement of wedge 142 causes actuator 138 to move outwardly against the bias of wave spring 74 to thereby engage friction facing 136 with side walls of channel 80 and thereby providing a braking force against relative movement of brake 10 and channel 80 to thereby stop movement of the brake 10 relative to the guide rail 98.

It should then be appreciated that the angle of the wedge surface of actuator 138 mechanically multiplies the force provided by compression spring 176 and redirects axial displacement of wedge 142 into displacements of friction facing 136, with the transverse displacements of the friction facing 136 relative to the axial displacement of wedge 142 being dependent upon the angle of the wedge surface.

Brake 10 according to the preferred teachings of the present invention is formed from relatively few components, which are easily manufactured and assembled. Specifically, the components of brake 10 which cannot be purchased off the shelf can be easily machined from extruded or conventional stock. Likewise, assembly can be quickly performed without requiring extraordinary skill, tools, jigs, or the like.

Prior attempts at braking linear motion devices with a piston directly connected to internal drive mechanisms has resulted in uneven wear or other detraction in the efficiency of piston components. Brake 10 according to the preferred teachings of the present invention applies all braking force between friction facings 136 and channel 80, which are separate and face each other providing material force of braking. Those skilled in the art will recognize that in a system with only one friction facing being driven by an actuator assembly will minimize side loading where a single friction facing 136 is engaged to a single channel 80.

In the most preferred form, brake 10 can easily be used as an add on module for a linear motion device of any design.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, all changes that come within the meaning and range of equivalency of the claims are intended to be embraced therein.

The invention claimed is:

1. Apparatus comprising, in combination: a wedge moveable along a first axis, with the wedge having a wedge surface arranged nonparallel to the first axis; an actuator moveable along a second axis perpendicular to the first axis, with the actuator having a wedge engaging surface slideably mounted on the wedge surface, with the actuator having a friction creating portion; an adjustable guide, with the adjustable guide disposed to adjust the wedge in the second axis, with movement of the actuator along the second axis being dependent on movement of the wedge along the first axis; and a wedge axial mover in contact with but not attached to the wedge for moving the wedge in both directions along the first axis, with the axial mover being isolated from any forces perpendicular to the first axis.

2. The apparatus of claim 1 with the wedge axial mover comprising, in combination: a first chamber; and a first piston moveable in the first chamber along the first axis; with the first piston in contact with but not attached to the wedge to move the wedge along the first axis in response to introduction of fluid in the first chamber, with the first piston being isolated from any forces perpendicular to the first axis.

3. The apparatus of claim 2 with the first chamber separated from the wedge by a stem guide, with the first piston further having a stem, with the stem extending along the first axis in the stem guide and with the stem abutting the wedge opposite of the stem guide than the first chamber, with the stem being isolated from any forces perpendicular to the first axis.

4. The apparatus of claim 2 with the wedge axial mover further comprising, in combination: a second chamber; and a second piston moveable in the second chamber along the first axis, with the second piston in contact with but not attached to the wedge to move the wedge along the first axis in response to introduction of fluid in the second chamber, with the second piston being isolated from any forces perpendicular to the first axis.

5. The apparatus of claim 4 with the second piston having the shape of a disk, with the disk having a surface perpendicular to the first axis and with the surface abutting the wedge, with the surface being isolated from any forces perpendicular to the first axis.

6. The apparatus of claim 4 with the introduction of fluid in the first chamber and the introduction of fluid in the second chamber moving the first piston and the second piston in the same direction.

7. The apparatus of claim 1 with the wedge axial mover comprising a spring mounted along the first axis, with the wedge being biased by the spring in one direction along the first axis.

8. The apparatus of claim 1 further comprising, in combination: a housing, with the adjustable guide adjustable outside the housing opposite to the actuator and adjustable in the second axis perpendicular to the first axis, with the wedge further having a guide engaging surface slideably mounted on the adjustable guide to adjust the position of the wedge in the second axis by slideable contact with the adjustable guide.

9. The apparatus of claim 8 with the housing having a disk shaped opening, with the adjustable guide having a disk shape for receipt in the disk shaped opening, and with the wedge slidably mounted on the adjustable guide to adjust the position of the wedge in the second axis by slideable contact with the adjustable guide.

10. The apparatus of claim 9 with the disk shaped opening having a threaded guide aperture for receipt of the adjustable guide, with the adjustable guide further having threads for slidably mounting in the threaded guide aperture to adjust the position of the wedge in the second axis by slideable contact with the adjustable guide.

11. The apparatus of claim 8 with the wedge further having a first plurality of rollers mounted on the wedge surface of the wedge and a second plurality of rollers mounted on the guide engaging surface of the wedge, with the first plurality of rollers contacting the wedge engaging surface of the actuator, and the second plurality of rollers contacting the adjustable guide.

12. The apparatus of claim 11 with the first plurality of rollers mounted on bearings on the wedge and having contact with the wedge engaging surface of the actuator, and with the second plurality of rollers mounted on bearings on the wedge and having contact with the adjustable guide.

13. The apparatus of claim 1 with the wedge engaging surface forming a wedge shaped slot in the actuator to provide mechanical advantage to the wedge when the wedge engages the actuator to move the friction creating portion.

14. The apparatus of claim 1 further comprising, in combination:
a housing, with the friction creating portion comprising a first friction facing that is slideably received in the housing along the first axis, with the first friction facing being elongated along the first axis.

15. The apparatus of claim 1 further comprising, in combination:
a housing having a disk shaped opening, with the adjustable guide having a disk shape for receipt in the disk shaped opening, and with the wedge slideably mounted on the adjustable guide to adjust the position of the wedge in the second axis by slideable contact with the adjustable guide.

16. The apparatus of claim 15 with the disk shaped opening having a threaded guide aperture for receipt of the adjustable guide, with the adjustable guide further having threads for slideably mounting in the threaded guide aperture to adjust the position of the wedge in the second axis by slideable contact with the adjustable guide.

17. The apparatus of claim 16 with the wedge further having a first plurality of rollers mounted on the wedge surface of the wedge and a second plurality of rollers mounted on a second side of the wedge, with the first plurality of rollers contacting the wedge engaging surface of the actuator, and the second plurality of rollers contacting the adjustable guide.

18. The apparatus of claim 17 with the wedge axial mover comprising, in combination: a first chamber; and a first piston, moveable in the first chamber along the first axis, for moving the wedge along the first axis in response to introduction of fluid in the first chamber, with the first piston being isolated from any forces perpendicular to the first axis.

* * * * *